(12) United States Patent
Schilling et al.

(10) Patent No.: US 8,514,492 B2
(45) Date of Patent: Aug. 20, 2013

(54) MULTILAYER BODY AND METHOD FOR PRODUCING A MULTILAYER BODY

(75) Inventors: Andreas Schilling, Hagendorn (ZG) (CH); Wayne Robert Tompkin, Baden (CH)

(73) Assignee: OVD Kinegram AG, Zug (CH)

( * ) Notice: Subject to any disclaimer, the term of this patent is extended or adjusted under 35 U.S.C. 154(b) by 527 days.

(21) Appl. No.: 12/682,879

(22) PCT Filed: Oct. 15, 2008

(86) PCT No.: PCT/EP2008/008711
§ 371 (c)(1),
(2), (4) Date: Apr. 13, 2010

(87) PCT Pub. No.: WO2009/049866
PCT Pub. Date: Apr. 23, 2009

(65) Prior Publication Data
US 2010/0290121 A1    Nov. 18, 2010

(30) Foreign Application Priority Data
Oct. 15, 2007  (DE) .......................... 10 2007 049 512

(51) Int. Cl.
*G02B 27/10* (2006.01)
*B29D 11/00* (2006.01)

(52) U.S. Cl.
USPC ............................ 359/619; 359/618; 359/623

(58) Field of Classification Search
USPC ......... 359/618–626, 443, 454–455; 457/162, 457/164, 165, 226–227, 553–555; 264/1.1, 264/1.32
See application file for complete search history.

(56) References Cited

U.S. PATENT DOCUMENTS

| | | | |
|---|---|---|---|
| 3,241,429 A | 3/1966 | Rice et al. | |
| 3,635,778 A | 1/1972 | Rice et al. | |
| 4,765,656 A | 8/1988 | Becker et al. | |
| 4,892,336 A | 1/1990 | Kaule et al. | |
| 5,254,390 A * | 10/1993 | Lu | 428/156 |
| 5,712,731 A | 1/1998 | Drinkwater et al. | |
| 6,650,480 B2 * | 11/2003 | Tanaka | 359/618 |
| 2004/0217177 A1 | 11/2004 | Hoppe et al. | |
| 2005/0180020 A1 | 8/2005 | Steenblik et al. | |
| 2007/0063053 A1 | 3/2007 | Bergmann et al. | |
| 2008/0309063 A1 | 12/2008 | Zintzmeyer | |
| 2009/0008923 A1 * | 1/2009 | Kaule et al. | 283/67 |
| 2010/0277805 A1 | 11/2010 | Schilling et al. | |

FOREIGN PATENT DOCUMENTS

| | | |
|---|---|---|
| DE | 1447789 | 10/1969 |
| DE | 1797183 | 11/1969 |
| DE | 3609090 | 9/1987 |
| DE | 10126368 | 12/2002 |
| DE | 10358784 | 7/2005 |
| DE | 102006005000 | 8/2007 |
| EP | 0219012 | 4/1987 |

(Continued)

*Primary Examiner* — Dawayne A Pinkney
(74) *Attorney, Agent, or Firm* — Hoffmann & Baron, LLP

(57) ABSTRACT

The invention concerns a multilayer body and a process for producing a multilayer body. The multilayer body has a transparent first layer in which a multiplicity of cylindrical lenses of a length of more than 2 mm and a width of less than 400 µm are shaped, which are arranged in accordance with a micro-lens grid spanning a first co-ordinate system having a co-ordinate axis X1 which is determined by the focal point lines of the cylindrical lenses, and a co-ordinate axis Y2 perpendicular thereto.

41 Claims, 6 Drawing Sheets

(56) References Cited

FOREIGN PATENT DOCUMENTS

| | | |
|---|---|---|
| JP | 4218624 | 10/1942 |
| WO | WO9427254 | 11/1994 |
| WO | WO02096646 | 12/2002 |
| WO | WO2004036507 | 4/2004 |
| WO | WO2005106601 | 11/2005 |
| WO | WO2006137738 | 12/2006 |
| WO | WO2007020048 | 2/2007 |
| WO | WO2007076952 | 7/2007 |

* cited by examiner

MULTILAYER BODY AND METHOD FOR PRODUCING A MULTILAYER BODY

This application claims priority based on an International Application filed under the Patent Cooperation Treaty, PCT/EP2008/008711, filed on Oct. 15, 2008 and German Application No. DE 102007049512.0-45, filed on Oct. 15, 2007.

BACKGROUND OF THE INVENTION

The invention concerns a multilayer body having a transparent first layer in which a multiplicity of microlenses is shaped, and a second layer which is arranged beneath the first layer in a fixed position relative to the first layer and which has a multiplicity of microscopic structures, and a process for the production of such a multilayer body.

Multilayer bodies with microlenses and microimages arranged beneath the microlenses are used in different ways as security elements for security documents such as for example banknotes or credit cards.

Thus on the one hand security elements are known, in which there is arranged a two-dimensional array of spherical microlenses above a two-dimensional array of identical repetitive microimages. Such an arrangement is described for example in U.S. Pat. No. 5,712,731. The security element has a multiplicity of identical spherical microlenses arranged in accordance with a regular two-dimensional microlens grid. The security element further has a multiplicity of identical printed microimages arranged in accordance with a regular two-dimensional microimage grid. The period of the microimage grid and the microlens grid is identical. The spherical microlenses arranged in the microlens grid produce a reproduction of the microimages, which is enlarged point-wise, so that overall an enlarged representation of the microimage becomes visible to the viewer. As the pixel, respectively represented by the microlenses, of the respective microimage changes in dependence on the viewing angle, that affords an optically variable impression of the enlarged representation of the microimage.

Arrangements of microimages and microlenses are also known, in which two or more different microimages which are visible in dependence on the viewing angle are associated with a microlens. Thus DE 103 58 784 A1 describes for example a data carrier in which different items of information which include for example a serial number of the banknote are written in by means of a laser beam at different directions. A recording layer of the data carrier is locally blackened by the action of the laser beam so that, for each of the items of information which are written in at different directions an associated microimage is written in, beneath each of the lenses. Thus, provided beneath each of the microlenses are a plurality of microimages which become visible at different viewing angles. In that case the respective microimages associated with the same item of information respectively contain only a part of the items of information which are composed of the representation of the individual microimages. By virtue of the high information density (a plurality of microimages per microlens) and the high demands in terms of register accuracy of the association between microimages/microlenses, it is necessary with that process to use microlenses of relatively large dimensions and to effect recording of the microimages in the recording layer only after the application of the microlens array to the recording layer, individually for each security document, resulting in disadvantages in regard to production costs.

SUMMARY OF THE INVENTION

Now the object of the invention is to provide an improved multilayer body and a process for the production thereof.

That object is attained by a multilayer body having a transparent first layer in which a multiplicity of microlenses is shaped, and a second layer which is arranged beneath the first layer in a fixed position relative to the first layer and which has a multiplicity of microscopic structures, in which the microlenses are cylindrical lenses of a length of more than 2 mm and a width of less than 400 µm which are arranged in accordance with a microlens grid spanning a first co-ordinate system having a co-ordinate axis X1 which is determined by the focal point lines of the cylindrical lenses and a co-ordinate axis Y1 which is different in relation thereto, that is to say which is linearly independent, the microscopic structures are in the form of microimages distorted along a transverse axis with respect to a longitudinal axis in accordance with a transformation function and the microscopic structures are arranged in accordance with a microimage grid spanning a second co-ordinate system having a co-ordinate axis X2 and a co-ordinate axis Y2 which is different in relation thereto, that is to say which is linearly independent, and in a region of the multilayer body in which the microlenses of the microlens grid and the microscopic structures of the microimage grid are in superposed relationship the line spacing determined by the spacing of the focal point lines of the cylindrical lenses and the microimage spacing, which is determined by the spacing of the centroids of the microimages, of adjacent microlenses and microimages from each other differ by not more than 10%.

The multilayer body according to the invention is distinguished by an optical appearance which appears three-dimensionally for a human viewer and which, upon tilting of the multilayer body or when viewing the multilayer body from a changing viewing direction, exhibits an easily remembered motion effect. The multilayer body according to the invention thus generates an impressive optically variable effect which can be used as an optical security feature. The optically variable impression of the multilayer body according to the invention is distinguished over the optically variable effect mentioned in the opening part of this specification and generated by security elements based on two-dimensional spherical lens grids, by a greater light intensity and very much greater degrees of freedom in design, in relation to the motion effects which can be achieved. In addition the multilayer body according to the invention, in comparison with those security elements, has on the one hand a markedly greater tolerance in relation to manufacturing errors (angular errors, focus errors), whereby manufacture is improved. On the other hand the multilayer body according to the invention, in comparison with those security elements, offers increased protection in relation to copying of the security feature as the images presenting themselves to the human viewer do not only represent an enlarged representation of repetitively arranged identical microimages, that is to say the microimages do not arise directly out of the representation afforded to the human viewer. Rather, the image presenting itself to the human viewer markedly differs from that of the microimages so that imitation of the optical effect is only possible with difficulty (the microlenses and the microscopic structures are also arranged in a fixed position relative to each other so that copying of the microscopic structures is not possible without being influenced by the microlens grid).

Those advantages also arise in relation to the above-discussed security elements in which different items of information are written in by means of a laser, in different directions:

those security elements can also be easily imitated by recording the items of information occurring at the various angles of view, by suitably writing those items of information into an unwritten card body.

The invention thus provides an optically easily remembered security element which is difficult to imitate and which is inexpensive to produce.

The object of the invention is further attained by a process for producing a multilayer body in which a second layer having a multiplicity of microscopic structures is applied to a third layer, a transparent first layer is arranged above the third layer so that the second layer is arranged between the first and the third layers and the first and the third layers respectively project beyond the second layer on all sides, and the first, second and third layers for forming the multilayer body are laminated together by means of a tool engaging on the top side of the first layer and the underside of the third layer, using heat and pressure, wherein in the top side of the first layer a lens grid is shaped into the surface of the first layer by means of a pressing plate in which a negative form of a lens grid is shaped and which is part of the tool. By means of that production process the multilayer body according to the invention can be particularly inexpensively produced, wherein the resulting multilayer body has particularly good properties in relation to resistance to environmental influences and guarantees a very high level of protection from manipulation, particularly in the use of PC.

Advantageous developments of the invention are recited in the appendant claims.

Preferably the co-ordinate axis Y1 and the co-ordinate axis Y2 as well as the co-ordinate axis X1 and the co-ordinate axis X2 are respectively oriented in mutually parallel relationship in the region and the line spacing and the microimage spacing of adjacent microlenses and microscopic structures differs from each other in the region. In that respect the term 'in mutually parallel relationship' is used to denote a parallel-like orientation of the co-ordinate axes within the limits of manufacturing tolerances. It is also possible that, with a different line spacing and microimage spacing of adjacent microlenses and microscopic structures, the co-ordinate axis Y1 and the co-ordinate axis Y2 as well as the co-ordinate axis X1 and the co-ordinate axis X2 respectively include an angle of up to 5°, preferably up to 1°. If the line spacing and the microimage spacing of adjacent microlenses and microscopic structures do not differ from each other the co-ordinate axes Y1 and Y2 as well as the co-ordinate axes X1 and X2 preferably include in the region an angle of between 0.001° and 3°. It has been found that the optical impression of the multilayer body is improved by complying with those conditions.

In accordance with a preferred embodiment of the invention the cylindrical lenses are of a width of less than 400 µm, preferably a width of 150 to 30 µm. Preferably the length of the cylindrical lenses is selected to be between 2 mm and 100 mm, with a structure depth of the cylindrical lenses of between 2 µm and 100 µm, preferably a structure depth of between 15 µm and 40 µm. When those parameters are selected for the cylindrical lenses, the optical impression of the multilayer body is improved and the multilayer body can be particularly thin, whereby the multilayer body is particularly well suited to use on flexible security documents such as for example banknotes, identification documents or certificates, or also for product safeguard.

The microlenses are preferably in the form of refractive microlenses. It is however also possible for the microlenses to be in the form of diffractive microlenses. As already stated above the microlenses are cylindrical lenses, in particular lenses which have a focusing function and which have a focal point line as the focal point. In that respect they can have not only a spherical but also an aspheric polygonal lens function. When in the form of refractive microlenses the section at a right angle to the longitudinal axis of the cylindrical lenses through the cylindrical lenses has at least an outside contour which is convex in portion-wise fashion, for example in the form of a circular arc portion. It is however also possible for that convex outside contour to be triangular, in the form of a trapezium or in the form of a flattened circular arc portion.

It is also possible for concavely shaped cylindrical lenses to be used here. It is further possible for regions of the cylindrical lenses to be provided with a printing thereon or to be metallised in region-wise fashion. That printing or metallisation can be used to increase contrast or to add information, for example a logo or text, to regions of the optically variable image which is overall to be presented.

It has proven desirable for the grid spacing of the microlens grid to correspond to the sum of the width of the respective microlenses and an additional spacing of between 0 µm and 20% of the structure depth of the microlenses.

In a preferred embodiment of the present invention a one-dimensional grid is selected as the microlens grid, wherein the grid spacing of the microlenses of the microlens grid is constant in the region. In that case different motion effects in the region are preferably implemented by a variation in the grid spacings and the orientation of the microimages of the microimage grid, as explained hereinafter. It is possible in that way to inexpensively produce multilayer bodies with a different optical impression as the costs of production of the tools for shaping the microlens grid can be kept down and one and the same microlens grid can be used for different multilayer bodies which afford different optical impressions. It is however also possible for the grid spacings of the microlenses of the microlens grid in the region not to be selected to be constant as long as the above-specified condition is met. In that way interesting and attractive motion effects can be generated and imitation of the optical impression of the security element can be made more difficult. Thus it is for example possible to achieve interesting optical effects by a steady change in the grid spacings of the microlenses of the microlens grid or by a periodic variation in the grid spacings of the microlenses of the microlens grid. In that case the microimage spacing and the microlens spacing of adjacent microimages and microlenses mutually influence each other, as is also described in greater detail hereinafter.

Preferably the microimages are of a width of less than 400 µm and a length which is determined by the longitudinal axis in the orientation thereof and which is more than 2 mm. Preferably in that case the longitudinal axis of the microimages is oriented parallel to the co-ordinate axis X1 so that the transverse axis of the microimages which specifies the direction of the (1-dimensional) distortion of the microimages is transverse relative to the focal point line of the microlenses, that is to say at each point on the focal point line at a right angle thereto.

Preferably the microscopic structures are in the form of identical microimages which are distorted along a transverse axis in relation to a longitudinal axis in accordance with a transformation function. Furthermore it is also possible for the microscopic structures to be in the form of microimages which arise out of the distortion of a basic image which is identical for all microscopic structures, in accordance with the transformation function, that is to say the basic image is distorted along the transverse axis with respect to the longitudinal axis in accordance with the transformation function.

In addition it is also possible for the identical basic image to be distorted differently by different transformation functions in different regions.

Preferably the transformation function used, which defines the distortion of the microimages along the transverse axis with respect to the longitudinal axis, is a transformation function which linearly compresses the transverse axis of the microimages with respect to the longitudinal axis thereof, preferably by more than ten times. The term transverse axis is used to denote the axis which is at a right angle to the longitudinal axis at the respective point thereon. If the longitudinal axis is thus geometrically transformed, the longitudinal axis is thus for example of a looped line configuration, the transverse axis is thus also correspondingly geometrically shaped.

A microimage defined by the co-ordinates $x_1$ and $y_1$ is thus for example produced specified as follows on the co-ordinates $x_2$ and $y_2$ of a distorted microimage:

$$y_2 = \Delta \cdot s \cdot y_1$$

$$x_2 = \Delta \cdot x_1$$

wherein the upsetting compression factor s is greater than 10.

In that case the value $\Delta$ is preferably so selected that the extent of the microimage along the transverse axis is in no region greater than the microimage spacing.

The co-ordinate axis X2 is preferably determined by the longitudinal axis of the distortion of the microimages. It is however also possible for the longitudinal axis of the distortion of the microimages not to coincide with the co-ordinate axis X2, but to depend on the geometrical configuration of the resulting optical appearance.

In accordance with a preferred embodiment of the invention the microimage grid is formed by a two-dimensional microimage grid having two or more microscopic structures arranged in succession in the direction of the co-ordinate axis X2. Preferably in that way a one-dimensional microlens grid is combined with a two-dimensional microimage grid. That makes it possible to generate a multiplicity of simple motion effects.

Thus for example the grid spacings of the microimages in the region are respectively selected to be constant in the direction of the co-ordinate axis Y2 and the co-ordinate axis X2. In that way it is possible to generate a unitary motion effect in the region, wherein the direction of the motion effect can be influenced by the choice of the displacement of the microimages disposed in mutually juxtaposed relationship in the direction of the co-ordinate axis X2. When the multilayer body is tilted the optical representation presented by the multilayer body appears to move in one direction, wherein the angle of the motion axis relative to the tilt axis is determined by the displacement of the microimages disposed in mutually juxtaposed relationship in the direction of the co-ordinate axis X2. If that displacement is selected to be constant over the co-ordinate axis X2, the optical representation appears to move in the tilting motion along a linear straight line. If the displacement is not selected to be constant it is also possible to produce non-linear motion patterns, for example in the form of a looped line.

It is also possible for the grid spacings of the microimages in the region to be constant in the direction of the co-ordinate axis Y2 and for the grid spacings of the microimages in the direction of the co-ordinate axis X2 to vary in dependence on the co-ordinate y determined by the co-ordinate axis Y2 and/or the co-ordinate x determined by the co-ordinate X2, in accordance with a function F (x, y). It is possible in that way to implement motion effects in which, upon tilting of the multilayer body, optical representations move in different directions which assume an angle of between 0° and 180°.

To produce images which visually appear the same and which move in different opposite directions of movement, first similar microimages are provided in a first subregion, which microimages are arranged at a microimage spacing relative to each other which is smaller than the microlens spacing. Arranged in a second subregion of the region are second similar microimages which are mirrored in relation to the first microimages at the longitudinal axis of the microimages, at a microimage spacing greater than the microlens spacing.

In a further preferred embodiment of the invention in a first subregion and in a second subregion arranged beside the first subregion of the region the lens spacing determined by the focal point lines of the cylindrical lenses and/or the microimage spacing determined by the spacing of the centroids of the microimages from each other are selected to be different. That provides that adjacent representations move at different speeds or in different directions upon being tilted. If then the difference of the microimage spacing and the microlens spacing is selected to be positive in the first subregion and negative in the second subregion the representations then move in opposite directions.

So that the same visually perceptible image moves in opposite directions in the first and second subregions for the human viewer (caused by the positive/negative difference in the spacings), then—as already stated hereinbefore—microimages which are mirrored relative to each other about the longitudinal axis of the microimages are to be provided in the first and second subregions.

Further interesting and attractive motion effects can be achieved in that, in a first subregion of the region and in a second subregion of the region, that is arranged beside the first subregion, the respective microimage grid and/or the microlens grid have a phase displacement relative to each other in relation to the co-ordinate axis Y1 and Y2 respectively, the co-ordinate axes Y1 and Y2 and/or X1 and X2 respectively include a different angle and/or the cylindrical lenses have a different focal length (here however it is still necessary for the microimages to be arranged in the focal plane of the microlenses). In that way it is possible to influence the direction of motion and speed of motion of the objects represented by the multilayer body in adjacent regions in such a way that they are markedly different from each other and that therefore affords a very marked optical impression. That impression can be further reinforced if two or more first and second subregions are arranged in alternate mutually juxtaposed relationship.

In the foregoing embodiments the microimages of the microimage grids in the respective first subregion and/or the respective second subregion are preferably respectively identical microimages. In addition however it is also possible for the microimages of the microimage grid to differ from each other in the region in order in that way to permit for example a change in size of the moving object or a circling or radial motion of the object which moves upon tilting of the body.

In a preferred embodiment of the invention the microimages of the microimage grid in the region are so formed by microimages which are formed by a geometric transformation of a basic image including rotation and/or increase or reduction in size of the basic image and subsequent distortion in accordance with the transformation function. In that way it is possible for the above-described complex motion patterns of an object defined by the basic image to be produced upon tilting of the multilayer body transversely relative to the longitudinal axis of the cylindrical microlenses.

In addition it is also possible for the microlenses of the microlens grid to have different focal lengths in region-wise fashion. Thus microlenses which have a first focal length are disposed in a first region of the microlens grid and microlenses which have a second focal length different therefrom are arranged in a second region of the microlens grid. The microscopic structures associated with the first region of the microlens grid are in that case arranged in a first plane of the multilayer body and the microscopic structures associated with the second region are arranged in a second plane of the multilayer body, wherein the first plane of the multilayer body and the second plane of the multilayer body are determined by the respective focal length of the microlenses in the first region and the second region respectively (spacing between microlenses and microscopic structures approximately corresponds to the respective focal length), that is to say the microscopic structures of the first region and the second region are arranged in different planes of the multilayer body.

The co-ordinate axes X1 and Y1 spanning the first co-ordinate system are preferably oriented in mutually right-angled relationship. It is however also possible for those co-ordinate axes to include another angle different from zero and 180° with each other. That also applies to the co-ordinate axes X2 and Y2 of the second co-ordinate system. In this respect the reference to right-angled orientation of the co-ordinate axes means that the co-ordinate axes are at a right angle to each other at any point, for example even in the case of a geometrically transformed co-ordinate system with for example a geometrically transformed circular co-ordinate axis X1.

Further interesting effects can be achieved if the first and/or second co-ordinate system is formed by a co-ordinate system with circular or looped line-shaped co-ordinate axes. Thus for example the focal point lines of the cylindrical lenses which determine the co-ordinate axis X1 are in the form of a multiplicity of concentric circles or a multiplicity of equidistantly arranged, looped line-shaped lines, and the co-ordinate axes X1 and X2 are formed by corresponding, geometrically transformed straight lines.

That affords further degrees of freedom which for example permit the circular motion of an object when the multilayer body is tilted. Those effects can be derived from the foregoing description insofar as the region is broken down into subregions which are selected to be correspondingly small and the parameters are selected as indicated hereinbefore in the respective region in accordance with the desired motion pattern.

In a preferred embodiment of the invention the second layer has a partial metal layer or a partial HRI layer (HRI=high refraction index) and the microscopic structures are formed by the regions of the second layer, in which the metal layer or HRI layer is provided, or by the regions of the second layer in which the metal layer or the HRI layer is not provided. That affords a particularly high-contrast optical impression so that the security element still remains clearly visible even under poor lighting conditions.

In the regions of the multilayer body, which are not covered by the partial metal layer or the partial HRI layer, the multilayer body is preferably transparent or at least semi-transparent so that, in dependence on the background against which the multilayer body is viewed (for example optical properties of a substrate on which the multilayer body is laminated) or in the transillumination viewing mode, that affords a correspondingly different optical impression. In addition it is also possible for the multilayer body to have a full-area metal layer and for the microscopic structures to be formed by coloured regions or special diffractive structures associated therewith.

In that respect the HRI layers can also involve a coloured HRI layer comprising for example a thin germanium or silicon layer.

Preferably the second layer has a replication lacquer layer with diffractive structures shaped therein, wherein in particular two or more different diffractive structures are shaped. In a preferred embodiment of the invention different diffractive structures are shaped in the second layer in the regions provided with the metallic layer or the HRI layer and in the regions not provided with the metallic layer or the HRI layer, of the second layer. In addition it is also possible that, in the region of the microscopic structures, a first surface relief associated with the microscopic structures is shaped in the second layer, that differing from the surrounding surface relief of the second layer. In that way it is possible further to improve the recognisability of the security feature and moreover to combine it also with further security features, thus for example to achieve a change in colour of the object along the path of motion. For example diffractive structures, matt structures, macrostructures, pure mirror structures, asymmetric structures or diffraction structures of zero order can be selected as the surface relief. The first and/or second surface relief are thus selected from a group in particular including linear grating structures, cross-grating structures, lens-like structures, asymmetric grating structures, zero-order grating structures or combinations of those structures. In addition it is also possible for the microscopic structures to be in the form of optically variable microscopic structures insofar as provided in the region of the microscopic structures is a thin-film layer system for producing viewing angle-dependent colour displacements, a cross-linked and oriented cholesteric liquid crystal material or printing with an optically variable printing material.

In addition it is also possible for the second layer to have coloured and transparent regions or regions which are of different colours and transparency and for the microscopic structures to be formed by the coloured regions, for example a coloured printing thereon, or by the transparent regions.

In addition it is also possible for the optical effect produced by the cylindrical lenses and the microscopic structures to be combined with further security features, for example with a hologram or a kinegram®. Those further security features can be arranged for example beside the region designed in accordance with the invention of the multilayer body, or can also be disposed in superposed relationship with that region. Preferably those further security elements form supplemental representations to the security features formed by the microlenses/microscopic structures.

It is also possible for the cylindrical lenses and the diffractive structures providing the further security feature to be arranged in mutually nested relationship in the form of a grid raster so that the representations generated by those elements are in superposed relationship.

In addition it is also possible for the multilayer body to have two or more layers which are each in the form of a respective second layer having a multiplicity of microscopic structures. Thus it is possible for example for the microscopic structures of a first second layer to be formed by a partial metal layer which is covered with a diffractive structure, for example a kinegram®, and for the microscopic structures of a second second layer to be formed by a coloured printing which—viewed from the side of the microlenses—is printed on the rear side of the metal layer or the replication lacquer layer. Thus for example upon tilting of the multilayer body the first second layer presents stars which appear in a diffractive interplay of colours and which move diagonally. In addition for example white and red printing—caused in conjunction with the cylindrical lenses—render visible white and red stars which move up and down when the multilayer body is tilted.

BRIEF DESCRIPTION OF THE DRAWINGS

The invention is described by way of example hereinafter by means of a number of embodiments with reference to the accompanying drawings.

DETAILED DESCRIPTION OF THE INVENTION

Figure 1:
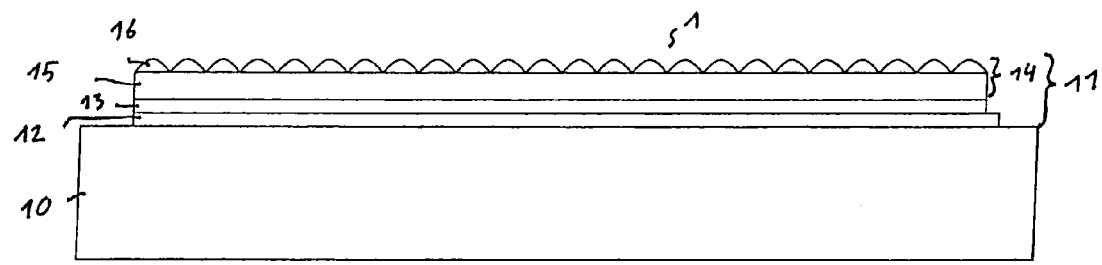
FIG. 1 shows a diagrammatic sectional view of a multilayer body according to the invention.

FIG. 1 shows a multilayer body 1 comprising a carrier layer 10 and a film body 11 applied to the carrier layer 10. The carrier layer 10 is preferably a carrier layer comprising a paper material. Thus for example the multilayer body 1 is a banknote, wherein the carrier layer 10 is formed by the paper substrate of the banknote and the film body 11 is formed by a lamination film or a transfer layer portion of a transfer film, in particular a hot embossing film, which is applied for example in the form of a patch or a strip as a security element to the carrier substrate of the banknote. In that respect it is also possible for the film body 11 to be arranged in the region of a transparent window in the banknote, in which the carrier substrate of the banknote is transparent or is partially removed by stamping or by means of a watermark. In addition it is also possible for the film body 11 to be applied in the form of a security element to any other carrier substrates, for example plastic carriers, but also metal or goods to be safeguarded.

The film body 11 has two layers 13 and 14 and an adhesive layer 12. The layer 13 is a microimage layer which can also be of a multilayer configuration and in which microscopic structures are provided in the form of microimages. The layer 14 is formed by a spacer layer 15 and a microlens layer 16. The microlens layer 16 has a multiplicity of microlenses which are in the form of cylindrical lenses of a length of 2 mm to 100 mm, a width of 10 µm to 400 µm and a structure depth of 2 µm to 100 µm. The spacer layer 12 is of a thickness d which corresponds approximately (±10%) to the focal length of the microlenses of the microlens layer 16. Preferably the microlens layer 16 and the spacer layer 15 are formed from the same material or at least have the same refractive index. The microlens layer 16 can be applied to the spacer layer 15, for example by means of intaglio printing. The microlens layer 16 can however also be shaped in the spacer layer 15, for example by hot embossing.

In addition it is possible for one or more further layers also to be provided between the layers 15 and 13 and the layers 13 and 12.

Figure 2:
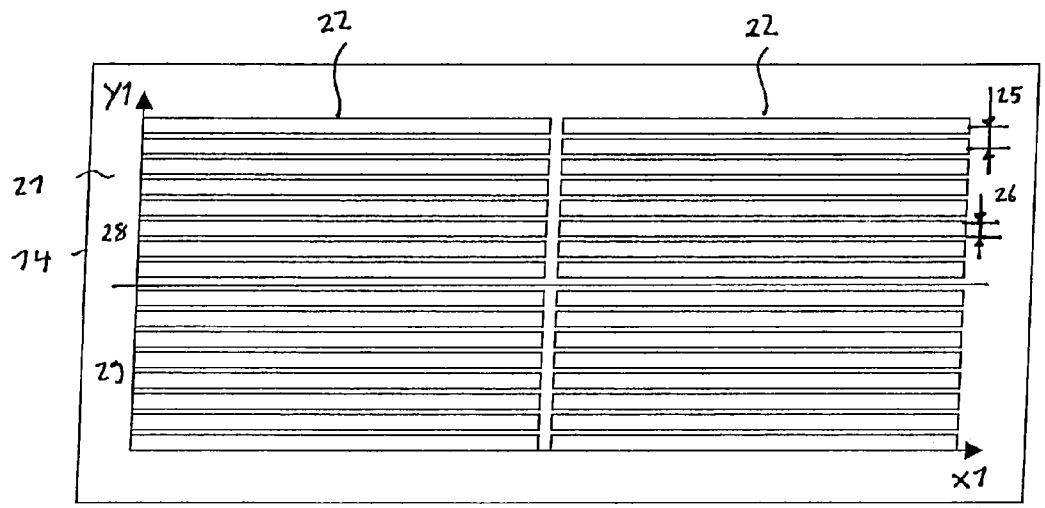
FIG. 2 shows a diagrammatic plan view of a first layer of a multilayer body according to the invention.

FIG. 2 now shows a possible embodiment of the layer 14. The layer 14 has a multiplicity of microlenses 22 arranged in the form of a microlens grid spanning a first co-ordinate system having a co-ordinate axis X1 and a co-ordinate axis Y1 at a right angle thereto. As can be seen in FIG. 2 the co-ordinate axis X1 is determined by the focal point lines of the cylindrical lenses and thus establishes the co-ordinate system. FIG. 2 now shows by way of example a two-dimensional configuration of the microlens grid 21, that is to say two or more microlenses 22 are arranged not only in succession in the direction of the co-ordinate axis Y1 but also arranged in succession in the direction of the co-ordinate axis X1. As shown in FIG. 2 the lens spacing 25 between two adjacent lenses 22 is determined by the spacing of the focal point lines of the cylindrical lenses. In addition the lenses 22 are of a lens width 26. In this case the microlens spacing 25 corresponds to the sum of the width 26 of the microlenses 22 and an additional spacing between 0 µm and 20% of the microlens width 26. As shown in FIG. 2 the grid spacing of the microlens grid, determined by the lens spacing 25 of adjacent microlenses 22, is selected to be constant in the regions 28 and 29. As already indicated above however it is also possible for the grid spacing of the microlens array to vary both in the direction of the co-ordinate axis X1 and also in the direction of the co-ordinate axis Y1 and also to be selected to be different in different columns of the microlens grid 21 or for different columns of the microlens array 21 to involve a phase displacement with respect to the focal point lines of the microlenses 22.

The representation in FIG. 2 serves in this case only to show the width of variation of the invention. As already indicated hereinbefore preferably a one-dimensional microlens grid is used as the microlens grid 21, in which two or more microlenses 22 are only arranged in succession in the direction of the co-ordinate axis Y1 and thus the microlens array is only formed from a column of microlenses 22.

Figure 3:
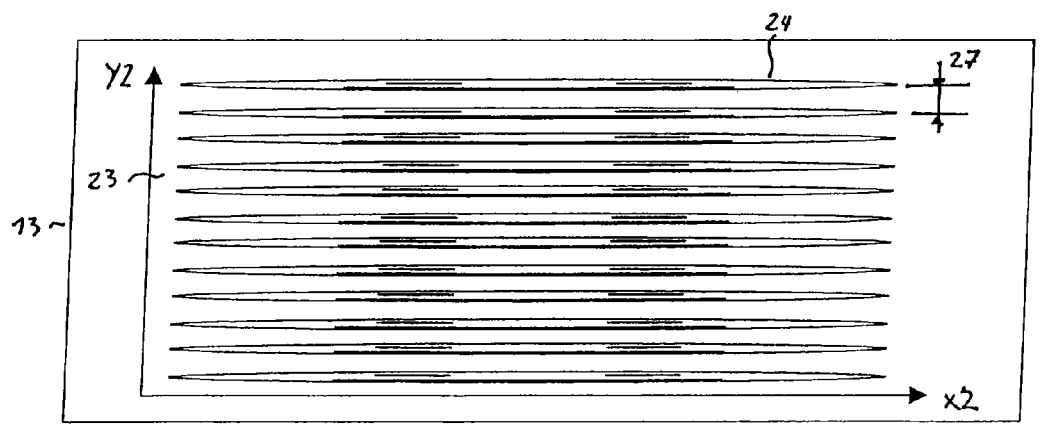
FIG. 3 shows a diagrammatic plan view of a second layer of a multilayer body according to the invention.

FIG. 3 now shows the structure of the microimage layer 13. Provided in the microimage layer 13 are a multiplicity of microscopic structures 24 which, as indicated in FIG. 3, are in the form of microimages which are distorted along a transverse axis with respect to a longitudinal axis in accordance with a transformation function and which are arranged in accordance with a microimage grid 23.

In regard to the visually perceptible sizes the microimages in this case are upset perpendicularly to the longitudinal axis of the microimages and thus compressed along the co-ordinate axis Y2. It is of significance in this respect that the compressive upsetting is perpendicular to the longitudinal axis of the microlenses, that is to say perpendicular to the focal point line of the cylindrical microlenses and thus the co-ordinate axis X1.

A second co-ordinate system having a co-ordinate axis X2 and a co-ordinate axis Y2 at a right angle thereto is defined by the microimage grid 23. In the FIG. 3 embodiment the longitudinal axis, along which the microimages are distorted in accordance with the transformation function, coincides with the co-ordinate axis X2 and thus determines the co-ordinate axis X2. That however is not required in all embodiments of the invention.

As can be seen in FIG. 3 the microimages are very greatly upset along the transverse axis with respect to the longitudinal axis of the microimages by the transformation function and are preferably compressively upset between 3 times and 500 times with respect to the transverse axis of the microimages. As already stated hereinbefore in this case the longitudinal axis preferably corresponds to the co-ordinate axis X2 and the transverse axis the co-ordinate axis Y2. The microimages used for the process according to the invention are thus of a quite unusual configuration and thus preferably involve a width of less than 400 μm and a length of more than 2 mm, preferably with a length-to-width ratio of 5:1 to 1000:1.

The microimage spacing 27 between the adjacent microscopic structures 24 is determined by the spacing of the centroids of the microimages, in accordance with which the microscopic structures 24 are shaped out, as shown in FIG. 3. In the FIG. 3 embodiment the microimage grid 23 is formed by a one-dimensional microimage grid with constant grid spacings determined by the microimage spacings 27. Simple motion effects in a region of the multilayer body can already be achieved by means of that simple arrangement, in combination with the microlens grid 21 of the layer 14, if, in that region, the line spacing 25 determined by the spacing of the focal point lines of the cylindrical lenses and the microimage spacing 27 determined by the spacing of the centroids of the microimages from each other differ by not more than 10% and is preferably different or the co-ordinate axes X1 and X2 and the co-ordinate axes Y1 and Y2 respectively assume an angle of −5° to +5° relative to each other.

Preferably however the microimage grid 23 is in the form of a two-dimensional microimage grid with two or more microscopic structures arranged in succession in the direction of the co-ordinate axis X2, as is described hereinafter with reference to FIGS. 4 to 9.

In regard to the configuration of the microscopic structures 24 in the layer 13 there are for example the following options: preferably the layer 13 has a thin metallic or dielectric reflection layer which is structured in the form of the microimages and thus provides the microscopic structures 24. Thus the layer 13 for example comprises a metal layer of a thickness of 50 nm which is demetallised in the negative form of the microimages so that the microscopic structures are formed by metallic mirror regions which are shaped out in the form of the microimages and which are surrounded by demetallised regions.

The reverse case is also possible.

In addition the layer 13 can also have a replication lacquer layer in which a surface relief is shaped, for example by means of UV replication or hot embossing. Thus it is possible for the layer 13 to have metallised and demetallised diffractive regions, wherein the metallised and the demetallised regions are shaped in the form of a microimages and thus constitute the microscopic structures. Preferably an HRI layer, for example a layer of ZnS, $SiO_x$, germanium or silicon, is used as the dielectric reflection layer. For example a layer of aluminium, copper, gold, silver or also chromium is used as the metallic reflection layer.

The layer 13 can also have regions in which different surface reliefs are shaped, wherein a first surface relief is associated with the microscopic structures and a second surface relief forms the background for same. Preferably the different surface reliefs in that case are coated over the full area with an HRI or metal layer and the difference between the optical action of the microscopic structures which are shaped in the form of the microimages and of the background is determined solely by the choice of the surface reliefs. It is however also possible for the layer 13 to comprise coloured and transparent or differently coloured and/or transparent regions, in which case the microstructures can be formed by the coloured, differently coloured or transparent regions.

Figure 4:
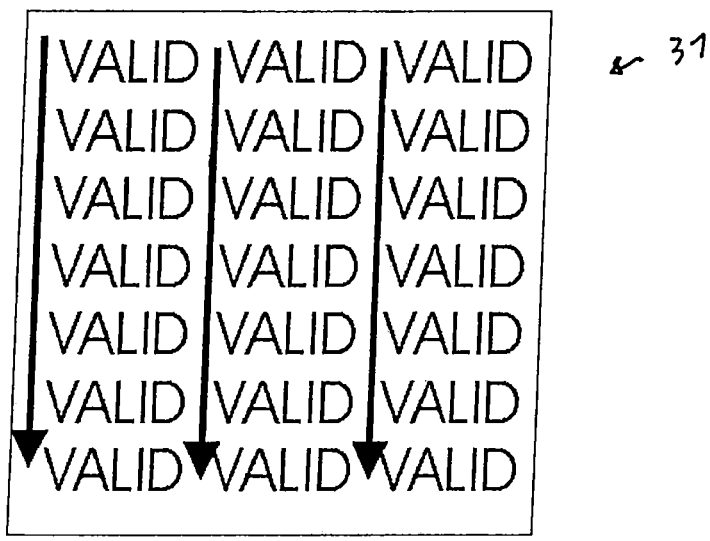
FIG. 4 shows a view of a multilayer body for an embodiment of the invention.

FIG. 4 shows a region 31 of a possible embodiment of the multilayer body 1. Provided in the region 31 over the full surface area is a one-dimensional microlens grid, wherein the microlenses of the microlens grid are spaced at a constant microlens spacing of 100 μm and the microlenses are of a width of 90 μm, with an intermediate space of 10 μm (and thus gives the above-mentioned grid of 100 μm), and are of a length of 60 mm. In the region 31 that one-dimensional microlens grid is in superposed relationship with a two-dimensional microimage grid comprising a multiplicity of microimages of a length of about 20 mm and a width of about 98 μm which are arranged in three columns. In this case the grid spacing of the microimages is constant in the region 31. The microimages involve identical microimages, the longitudinal axis of which, with respect to the transverse axis, is stretched approximately by 50 times, that is to say the transverse axis is upset with respect to the longitudinal axis by 50 times. The grid spacing of the microlens grid, which is determined by the spacing of the focal point lines of the cylindrical lenses, and the grid spacing of the microimage grid, which is determined by the spacing of the centroids of the microimages, differ from each other in this case by 2%. In this case the difference between the grid spacing of the microlens grid and the grid spacing of the microimage grid determines the magnification factor which is preferably selected in accordance with the upsetting factor. Preferably in this case the difference between the grid spacings is so selected that the grid spacing of the microlens grid divided by the difference of the grid spacings of the microlens grid and the microimage grid corresponds to the upsetting factor s.

In this case the co-ordinate axes X1 and Y1, and X2 and Y2 respectively, respectively include an angle of less than 5°. When the multilayer body is tilted the motion effect shown in FIG. 4 occurs in the region 31, that is to say the text 'VALID' which appears in three dimensions, appears to move in the movement in the direction of the arrows indicated in FIG. 4.

Figure 5:
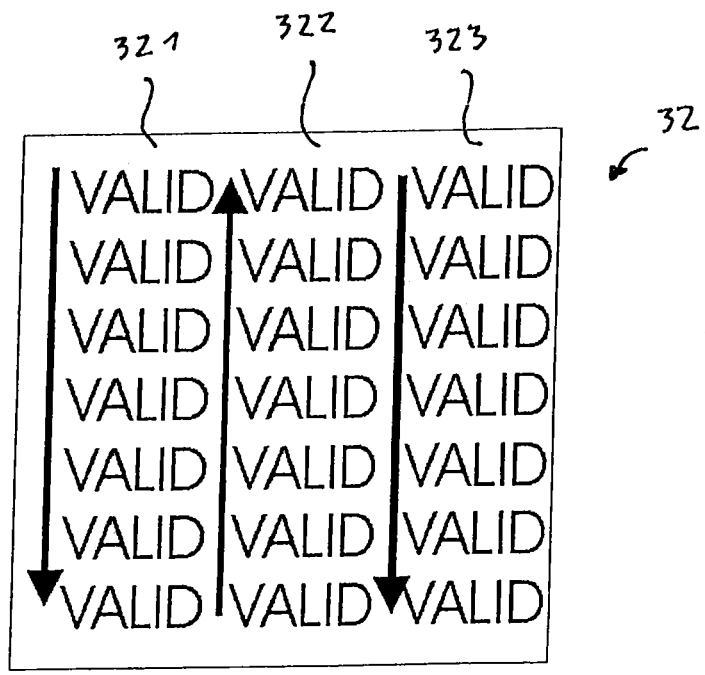
FIG. 5 shows a view of a multilayer body for a further embodiment of the invention.

FIG. 5 shows the optical appearance of a region 32 of a further embodiment of the multilayer body 32.

The multilayer body 1 is made up in the region 32 as in the region 31, with the difference that, in the mutually juxtaposed subregions 321, 322 and 323 of the region 32, the line spacing and/or the microimage spacing from each other differs. In the regions 321 and 323 the difference of the microimage spacing and the microlens spacing is positive while in the region 322 it is negative. In the regions 321 and 323 the microimage spacing is 105% of the microlens spacing and in the region 322 the microimage spacing is 95% of the microlens spacing. As a result, when the multilayer body 1 is tilted, the three-dimensional representations of the text 'VALID' appear to move as indicated by the arrows in FIG. 5 in a different direction in relation to the regions 321 and 323, that is to say when the multilayer body is tilted they move up and down in mutually opposite directions.

Figure 6:
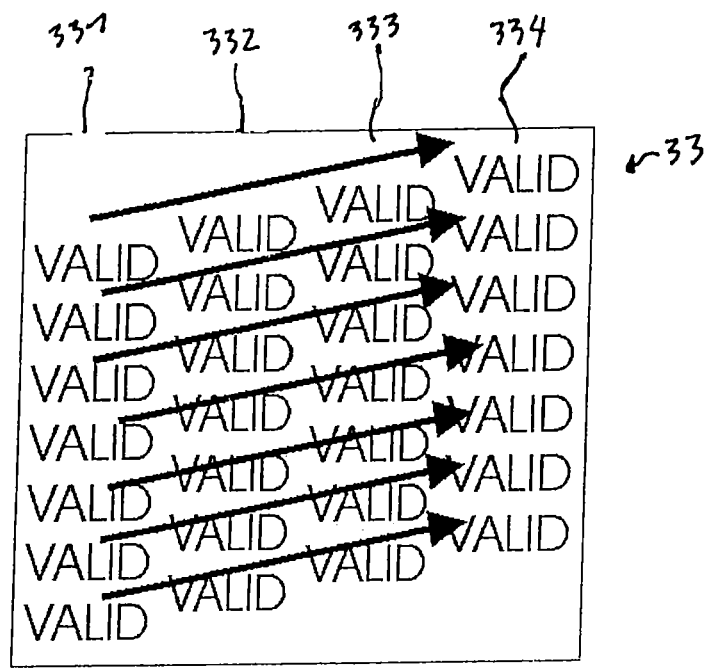
FIG. 6 shows a view of a multilayer body for a further embodiment of the invention.

FIG. 6 shows the optical appearance of a region 33 of a further embodiment of the multilayer body 1. The multilayer body 1 differs in the region 33 from the region 31 in that, in the mutually juxtaposed subregions 331 to 334 of the region 33, the respective microimage grid and/or the respective microlens grid have a phase displacement relative to each other in relation to the co-ordinate axis Y1 and Y2 respectively. In this case the direction of the motion is set by the magnitude of the phase displacement. When the multilayer layer 1 is tilted that therefore affords the motion pattern of the text 'VALID', as indicated in FIG. 6.

Figure 7:
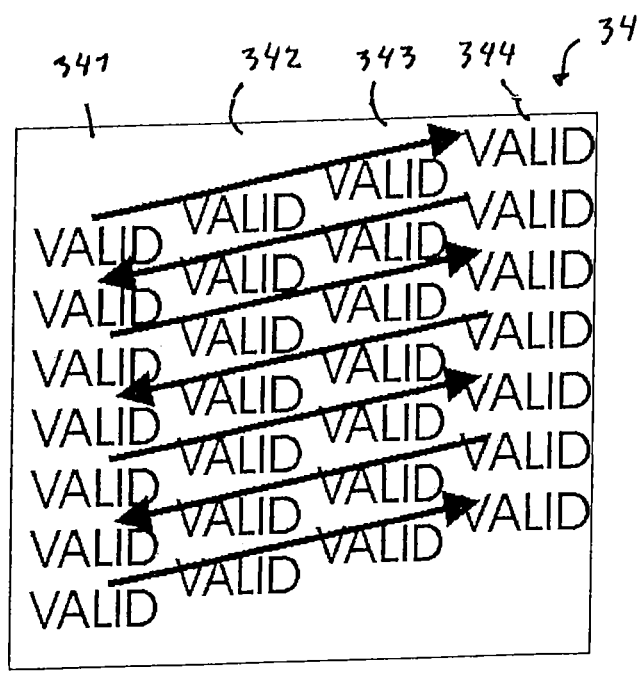
FIG. 7 shows a view of a multilayer body for a further embodiment of the invention.

FIG. 7 shows the optical appearance of a region 34 of a further embodiment of the multilayer body 1. The multilayer body 1 differs in the region 34 from the region 33 in that— besides a phase displacement of the microimages—in mutually juxtaposed subregions 341 to 344 the microimage spacing and the microlens spacing differ from each other additionally in subregions of the regions 341 to 341—as in the embodiment of FIG. 5. That gives the optical appearance indicated in FIG. 7 in which the text 'VALID' moves in opposite relationship, as indicated by the arrows in FIG. 7, when the multilayer body is tilted.

Figure 8:
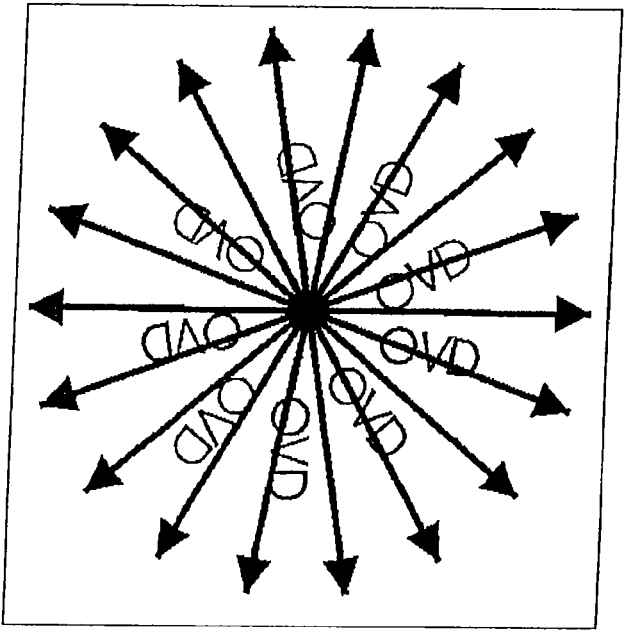
FIG. 8 shows a view of a multilayer body for a further embodiment of the invention.

FIG. 8 shows the optical appearance in a region 35 of a further embodiment of the multilayer body 1. The multilayer body 1 differs in the region 35 from the region 31 in many respects: thus the microimage grid is no longer made up of identical microimages. Instead the microimages of the region 35 are formed by microimages which are formed by geometrical transformation of a basic image including rotation and/or increase or reduction in size of the basic image and subsequent distortion in accordance with the transformation function. The grid spacings of the microimages are constant in the region 35 in the direction of the co-ordinate axis Y2, but the grid spacings of the microimages in the direction of the co-ordinate axis X2 are varied in dependence on the co-ordinates x, y, more specifically in such a way that the grid spacings increase in the direction of the co-ordinate axis X2 in dependence on the spacing from the centre point of the region 35. The images used for the respective positions in the microimage grid are selected from the above-defined set of microimages in accordance with the view shown in FIG. 8 so that when the multilayer body 1 is tilted the effect shown in FIG. 8 appears, that is to say the texts 'OVD' move outwardly when the multilayer body is tilted, as indicated by the arrows. In that respect, depending on the geometrical transformation of the basic image, that is respectively used, it is further possible for the text 'OVD' to also increase/decrease in size in that motion.

Figure 9:
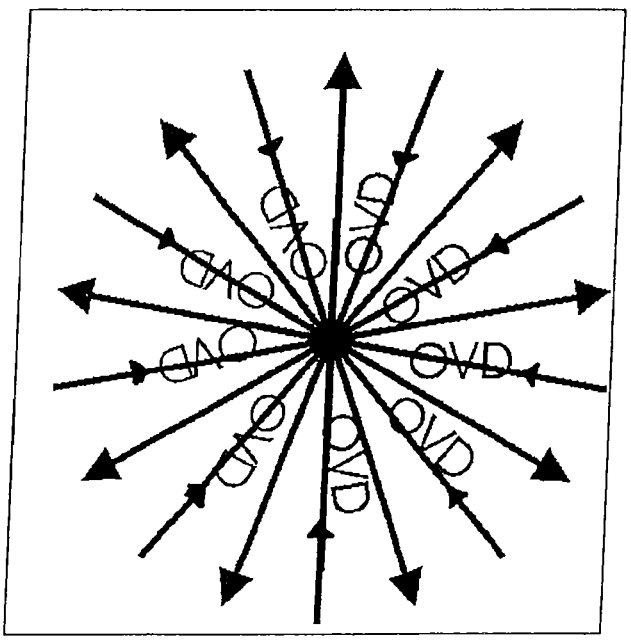
FIG. 9 shows a view of a multilayer body for a further embodiment of the invention.

FIG. 9 shows the optical appearance of a region 36 of a further embodiment of the multilayer body 1. The region 36 of the multilayer body differs from the region 35 in that in addition—as already indicated with reference to FIG. 5—the grid spacing of the microimages in the direction of the co-ordinate axis Y2 is selected differently in subregions so that, when the multilayer body is tilted, the text 'OVD' in subregions moves in the direction of the centre point of the region 36 while in other subregions of the region 36, when the multilayer body 1 is tilted, it moves outwardly, as indicated by the arrows in FIG. 9.

Figure 10:
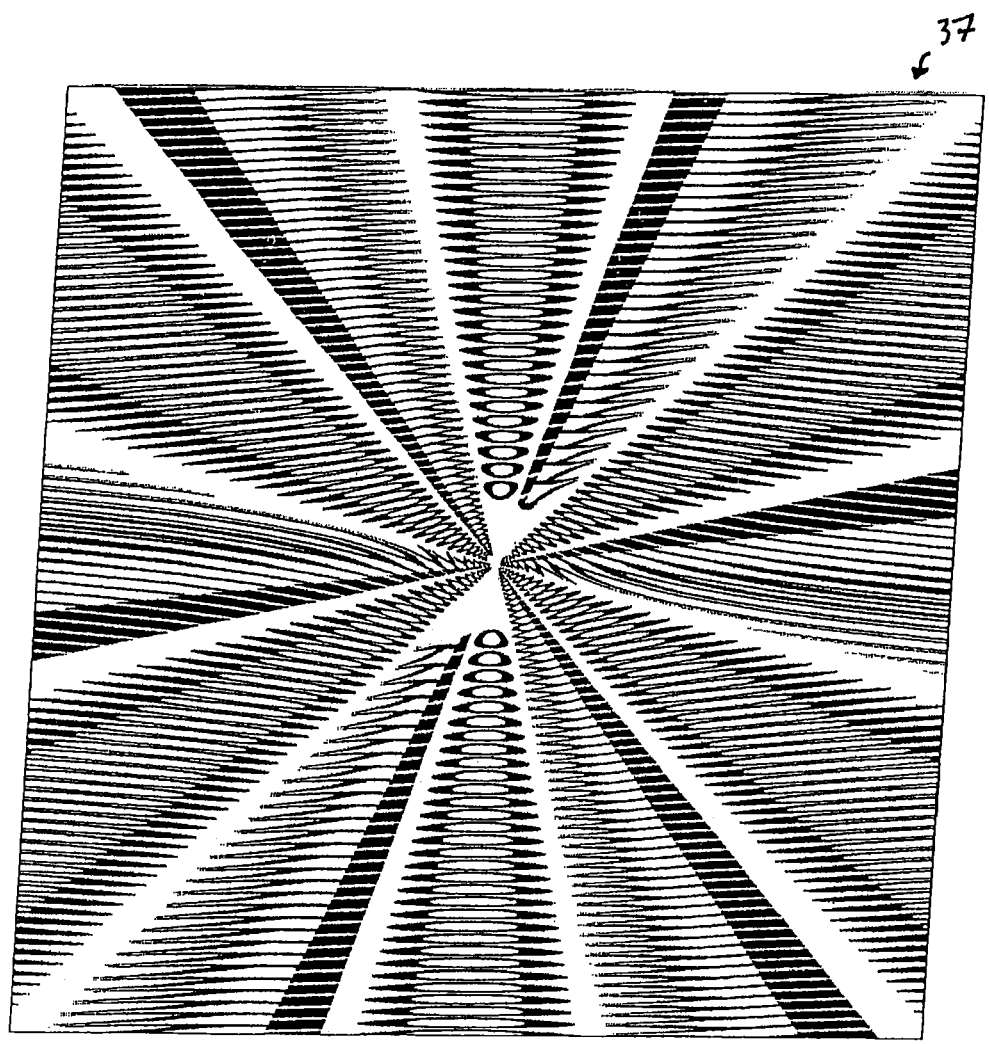
FIG. 10 shows a diagrammatic plan view of a second layer of a multilayer body according to the invention for a further embodiment of the invention.

FIG. 10 now shows a further possible embodiment of the microimage layer of a region 37. In this case the microimages of the microimage grid differ from each other in the region and in addition are arranged at a different microimage spacing in relation to the X2-axis in order thus, when the multilayer body is tilted, to cause a radial motion outwardly with a simultaneous change in size (an increase in size of the image impression for the viewer, here the words 'OK'). The grid spacings or grid widths of the microimages in the direction of the co-ordinate axis X2 are varied in dependence on the co-ordinates x, y, more specifically in such a way that the grid spacings in the direction of the co-ordinate axis X2 increase in size in dependence on the spacing from the centre point of the region 37. In that case the images used for the respective position in the microimage grid arise out of a representation of the letters 'O' and 'K' respectively, the size of which is increased in dependence on the spacing relative to the centre point of the region 37 in accordance with a transformation function and is then compressively upset in relation to a longitudinal axis defined by the focal point lines of the microlenses transversely with respect to that longitudinal axis by an upsetting factor which varies in the radial direction. In this embodiment the size of the visually perceptible image varies, that is to say the size of the representation which moves radially outwardly when the multilayer body is tilted, increasing in this case. As in this embodiment the grid width of the microlens grid is constant, the grid width of the microimage grid is suitably varied to give the increase in size and the upsetting factor is appropriately adapted, that is to say varied proportionally to the enlargement factor.

Figure 11:
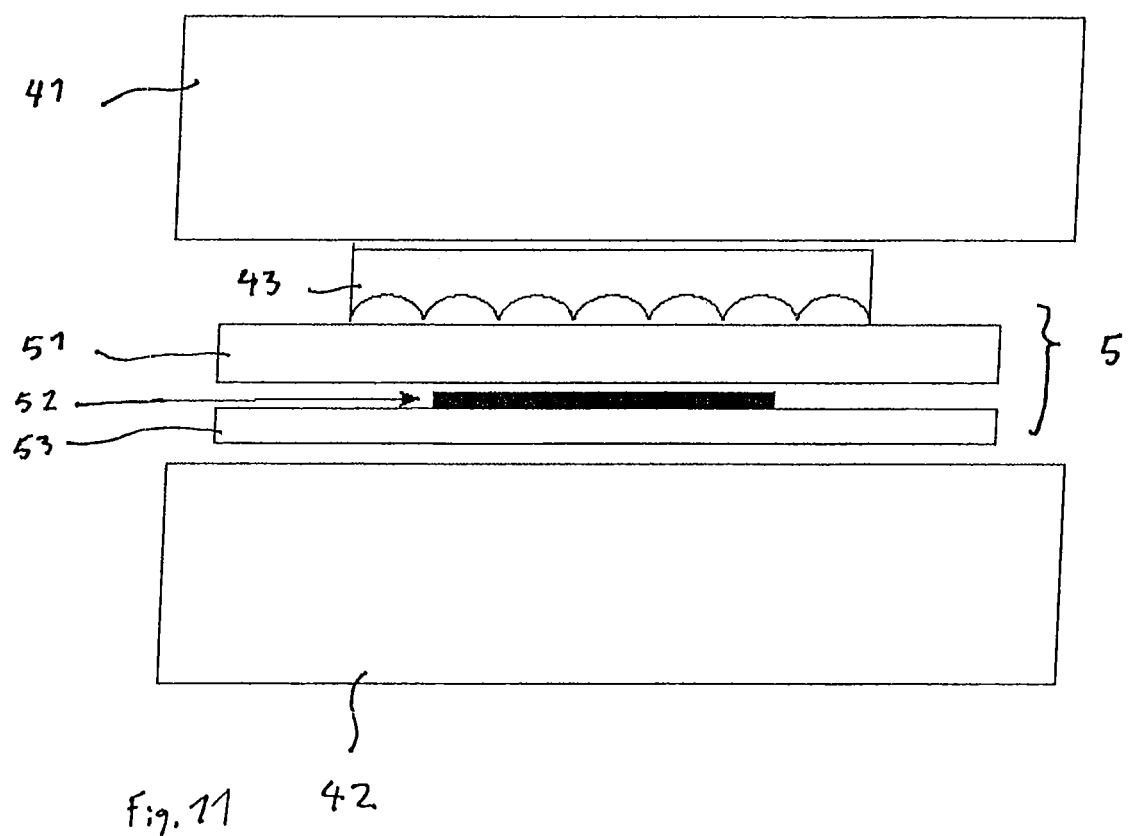
FIG. 11 shows a diagrammatic sectional view to illustrate a process for the production of a multilayer body according to the invention.

FIG. 11 shows a process for producing a multilayer body 5.

The multilayer body 5 is preferably a security document in card form, for example an identity card or pass, a credit card or a driving licence.

A layer 52 is applied to a plastic carrier 53. The plastic carrier 53 preferably involves a plastic film of a thickness of between 300 and 600 μm, preferably comprising polycarbonate. The layer 52 is preferably a multilayer film body which is formed by the transfer layer portion of a transfer film and applied for example by means of hot embossing in the form of a patch to a region of the plastic carrier 53. In this case the layer 52 is preferably formed like the layer 13 in FIG. 1 and has for example a metallised kinegram® in which the metallic reflection layer is metallised/demetallised in the form of the microimages. The layer 51 is now applied to the film body formed from the layers 52 and 53, the layer 51 preferably being a plastic film of a thickness of about 700 μm. The thickness of the layer 51 is preferably so selected that it approximately corresponds to the focal length of the microlenses of the microlens grid. That plastic film also preferably comprises polycarbonate. The resulting layer stack is now introduced into a laminating tool of which FIG. 7 shows by way of indication an upper pressing plate 41 and a lower pressing plate 42. The upper pressing plate 41 further has a nickel die 43 in which a negative form of a lens grid is shaped. The lens grid and the microimage grid provided in the layer 52 preferably involve a microlens grid and microimage grid respectively as shown in one of preceding FIGS. 1 to 10.

It is also possible for the layer 52 to comprise a plastic film, preferably a polycarbonate film, on to which the layer 13 as shown in FIG. 1 is laminated by means of hot embossing. The layer 52 is then placed as a sandwich between the layers 51 and then the entire system is laminated together.

The upper pressing plate 41 and the lower pressing plate 42 are now heated in a laminating step and moved towards each other so that the layers 51 to 53 are laminated together and at the same time the lens grid is shaped into the surface of the layer 51.

The invention claimed is:

1. A multilayer body having a transparent first layer in which a multiplicity of microlenses is shaped, and a second layer which is arranged beneath the first layer in a fixed position relative to the first layer and which has a multiplicity of microscopic structures,
   wherein the microlenses are cylindrical lenses of a length of more than 2 mm and a width of less than 400 μm which are arranged in accordance with a microlens grid spanning a first co-ordinate system having a coordinate axis X1 which is determined by the focal point lines of the cylindrical lenses and a co-ordinate axis Y1 which is different in relation thereto, the microscopic structures are in the form of microimages distorted along a transverse axis with respect to a longitudinal axis in accordance with a transformation function and the microscopic structures are arranged in accordance with a microimage grid spanning a second co-ordinate system having a co-ordinate axis X2 and a co-ordinate axis Y2, which is different in relation thereto, and the microlenses of the microlens grid and the microscopic structures of the microimage grid are in superposed relationship in a superposed region of the multilayer body, and wherein the microlenses have a line spacing determined by the spacing of the focal point lines of the cylindrical lenses, and the microimages have a microimage spacing, which is determined by the spacing of the centroids of the microimages, and wherein the co-ordinate axis Y1 and the co-ordinate axis Y2 as well as the co-ordinate axis X1 and the co-ordinate axis X2 are respectively oriented in mutually parallel relationship in the superposed region of the microlens grid and the microimage grid, and wherein the line spacing of adjacent microlenses differs from the microimage spacing of adjacent microscopic structures in the superposed region, the difference being less than 10%.

2. A multilayer body according to claim 1, wherein the co-ordinate axis Y1 and the co-ordinate axis Y2 as well as the co-ordinate axis X1 and the co-ordinate axis X2 respectively include in the region an angle of between −5° and +5°.

3. A multilayer body according to claim 1, wherein the cylindrical lenses are of a width of less than 400 μm.

4. A multilayer body according to claim 1, wherein the cylindrical lenses are of a length of between 2 mm and 100 mm.

5. A multilayer body according to claim 1, wherein the cylindrical lenses have a structure depth of 2 μm to 100 μm.

6. A multilayer body according to claim 1, wherein the microlens grid is defined by a single column of microlenses arranged in the direction of the co-ordinate axis Y1.

7. A multilayer body according to claim 1, wherein the grid spacing of the microlens grid is constant in the region.

8. A multilayer body according to claim 1, wherein the grid spacing of the microlens grid steadily changes in the region.

9. A multilayer body according to claim 1, wherein the grid spacing of the microlens grid is periodically varied in the region.

10. A multilayer body according to claim 1, wherein the grid spacing of the microlens grid corresponds to the sum of the width of one of the microlenses and an additional spacing between 0 μm and 20% of the structure depth of the microlenses.

11. A multilayer body according to claim 1, wherein the microimages are of a width of less than 400 μm and a length of more than 2 mm, said length being determined in its orientation by the longitudinal axis.

12. A multilayer body according to claim 1, wherein the longitudinal axis of the distortion is oriented parallel to the co-ordinate axis X1.

13. A multilayer body according to claim 1, wherein the co-ordinate axis X2 is determined by the longitudinal axis of the distortion.

14. A multilayer body according to claim 1, wherein the transverse axis of the microimages with respect to the longitudinal axis of the microimages is upset by the transformation function by more than 5 times.

15. A multilayer body according to claim 1, wherein the microimage grid is a two-dimensional microimage grid with two or more microscopic structures arranged in succession in the direction of the co-ordinate axis X2.

16. A multilayer body according to claim 15, wherein the grid spacings of the microimages in the region are constant in the direction of the co-ordinate axis Y2 and the grid spacings of the microimages vary in the direction of the co-ordinate axis X2 in dependence on the co-ordinate y determined by the co-ordinate axis Y2 and/or the co-ordinate x determined by the co-ordinate axis X2, in accordance with a function F(x, y).

17. A multilayer body according to claim 15, wherein the grid spacings of the microimages in the region are respectively constant in the direction of the co-ordinate axis Y2 and the co-ordinate axis X2, but the centroids of the microimages disposed in mutually juxtaposed relationship in the direction of the co-ordinate axis X2 have a displacement relative to each other.

18. A multilayer body according to claim 1, wherein in a first subregion of the region, and in a second subregion of the region, that is arranged beside the first subregion, the line spacing determined by the focal point lines of the cylindrical lenses and/or the microimage spacing determined by the spacing of the centroids of the microimages, differ from each other.

19. A multilayer body according to claim 18 wherein, in the first subregion, the difference of the microimage spacing and the microlens spacing is positive and in the second subregion it is negative.

20. A multilayer body according to claim 1, wherein, in a first subregion of the region and in a second subregion of the region, that is arranged beside the first subregion, the respective microimage grid and/or the microlens grid have a phase displacement relative to each other in relation to the co-ordinate axis Y1 and Y2 respectively.

21. A multilayer body according to claim 1, wherein, in a first subregion of the region and in a second subregion of the region, that is arranged beside the first subregion, the co-ordinate axes Y1 and Y2 and/or X1 and X2 respectively include a different angle.

22. A multilayer body according to claim 1, wherein, in a first subregion of the region and in a second subregion of the region, that is arranged beside the first subregion, the cylindrical lens have a different focal length.

23. A multilayer body according to claim 18 wherein two or more first and second subregions are arranged in alternately mutually juxtaposed relationship.

24. A multilayer body according to claim 18, wherein the microimages of the microimage grid in the first subregion and/or in the second subregion are respectively identical microimages.

25. A multilayer body according to claim 1, wherein the microimages of the microimage grid in the region differ from each other.

26. A multilayer body according to claim 1, wherein the microimages of the microimage grid in the region are formed by microimages formed by a geometrical transformation of a basic image including rotation and/or increase or reduction in size of the basic image and subsequent distortion in accordance with the transformation function.

27. A multilayer body according to claim 1, wherein the first and/or second co-ordinate system is formed by a co-ordinate system having circular or looped line-shaped co-ordinate axes.

28. A multilayer body according to claim 1, wherein the second layer has a partial metal layer and the microscopic structures are formed by the regions of the second layer in which the metal layer is provided or by the regions of the second layer in which the metal layer is not provided.

29. A multilayer body according to claim 1, wherein the second layer has a partial HRI layer and the microscopic structures are formed by the regions of the second layer in which the HRI layer is provided or by the regions of the second layer in which the HRI layer is not provided.

30. A multilayer body according to claim 1, wherein the second layer has a replication lacquer layer with diffractive structures shaped thereinto.

31. A multilayer body according to claim 30, wherein two or more different diffractive structures are shaped in the replication lacquer layer.

32. A multilayer body according to claim 28, wherein in the regions of the second layer that are provided with the metallic layer and in the regions of the second layer that are not provided with the metal layer different diffractive structures are shaped in the second layer.

33. A multilayer body according to claim 1, wherein in the region of the microscopic structures, a first surface relief associated with the microscopic structures is shaped into the second layer, which surface relief differs from the surrounding surface relief of the second layer.

34. A multilayer body according to claim 33, wherein the first surface relief and/or the second surface relief is selected from the group of a diffractive structure, a matt structure and a macrostructure, the first surface relief and/or the second surface relief including linear grating structures, cross grating structures, lens-like structures, asymmetric grating structures, zero-order grating structures or combinations of said structures.

35. A multilayer body according to claim 33, wherein the second layer has coloured and transparent regions or differently coloured and transparent regions and the microscopic structures are formed by the coloured regions or are formed by the transparent regions.

36. A multilayer body according to claim 1, wherein the second layer having the multiplicity of microscopic structures is applied to a third layer, the transparent first layer is arranged above the third layer so that the second layer is arranged between the first and the third layers and the first and the third layers respectively project beyond the second layer on all sides, and the first, second and third layers for forming the multilayer body are laminated together by means of a tool engaging on the top side of the first layer and the underside of the third layer, using heat and pressure, wherein in the top side of the first layer the lens grid is shaped into the surface of the first layer by means of a pressing plate in which a negative form of the lens grid is shaped and which is part of the tool.

37. A multilayer body according to claim 36, wherein the first layer and the third layer are formed from a plastic film of a thickness of 50 to 500 μm, which comprises polycarbonate.

38. A multilayer body comprising:
a transparent first layer having a multiplicity of microlenses shaped in a surface thereof, the microlenses being cylindrical lenses of a length of more than 2 mm and a width of less than 400 μm and being arranged in accordance with a microlens grid spanning a first coordinate system having a coordinate axis X1 and a coordinate axis Y1, the coordinate axis X1 being defined by the focal point lines of the cylindrical lenses and the coordinate axis Y1 being different in relation thereto, the microlenses within the microlens grid having a line spacing defined by the spacing of the focal point lines of the cylindrical lenses; and
a second layer arranged beneath the first layer in a fixed position relative to the first layer, the second layer having a multiplicity of microscopic structures in the form of microimages, the microimages being formed by a geometrical transformation of a basic image including rotation and/or increase or reduction in size of the basic image and subsequent distortion in accordance with the transformation function along a transverse axis with respect to a longitudinal axis, the microscopic structures being arranged in accordance with a microimage grid spanning a second coordinate system having a coordinate axis X2 and a co-ordinate axis Y2, the coordinate axis Y2 being different in relation thereto, the microscopic structures of the microimage grid having a microimage spacing, which is determined by the spacing of the centroids of the microimages,
wherein the microlenses of the microlens grid and the microscopic structures of the microimage grid are in superposed relationship in a superposed region of the multilayer body, and
wherein the line spacing of adjacent microlenses differ from the microimage spacing of adjacent microscopic structures by not more than 10% in the superposed region.

39. A multilayer body according to claim 38, wherein the co-ordinate axis Y1 and the co-ordinate axis Y2 as well as the co-ordinate axis X1 and the co-ordinate axis X2 are respectively oriented in mutually parallel relationship in the region and the line spacing and the microimage spacing of adjacent microlenses and microscopic structures differs from each other in the superposed region.

40. A multilayer body according to claim 38, wherein the microimages of the microimage grid in the region differ from each other.

41. A multilayer body comprising:
a transparent first layer having a multiplicity of microlenses shaped in a surface thereof, the microlenses being cylindrical lenses of a length of more than 2 mm and a width of less than 400 μm and being arranged in accordance with a microlens grid spanning a first coordinate system having a coordinate axis X1 and a coordinate axis Y1, the coordinate axis X1 being defined by the focal point lines of the cylindrical lenses and the coordinate axis Y1 being different in relation thereto, the microlenses within the microlens grid having a line spacing defined by the spacing of the focal point lines of the cylindrical lenses; and
a second layer arranged beneath the first layer in a fixed position relative to the first layer, the second layer having a multiplicity of microscopic structures in the form of microimages distorted along a transverse axis with respect to a longitudinal axis in accordance with a transformation function, the microscopic structures being arranged in accordance with a microimage grid spanning a second coordinate system having a coordinate axis X2 and a co-ordinate axis Y2, the coordinate axis Y2 being different in relation thereto, the microscopic structures of the microimage grid having a microimage spacing, which is determined by the spacing of the centroids of the microimages,
wherein the microlenses of the microlens grid and the microscopic structures of the microimage grid are in superposed relationship in a superposed region of the multilayer body, and
wherein the line spacing of adjacent microlenses differ from the microimage spacing of adjacent microscopic structures by not more than 10% in the superposed region, and
wherein the superposed region is divided into a first subregion and a second subregion arranged beside the first subregion, the line spacing of adjacent microlenses in the first subregion differing from the the microimage spacing of adjacent microscopic structures in the first subregion by a positive value, and the line spacing of adjacent microlenses in the second subregion differing from the microimage spacing of adjacent microscopic structures in the second subregion by a negative value.

* * * * *